US012649138B2

(12) United States Patent
Dufault et al.

(10) Patent No.: US 12,649,138 B2
(45) Date of Patent: Jun. 9, 2026

(54) INTEGRATED MICRO-REACTORS FOR HYDROGEN SYNTHESIS VIA METHANE REFORMING

(71) Applicant: SOCIETE DE COMMERCIALISATION DES PRODUITS DE LA RECHERCHE APPLIQUÉE SOCPRA SCIENCES ET GENIE S.E.C., Sherbrooke (CA)

(72) Inventors: Jean-François Dufault, Sherbrooke (CA); Mathieu Picard, Sherbrooke (CA); Luc Frechette, Sherbrooke (CA); Dino Mehanovic, Sherbrooke (CA); Jean-François Peloquin, Sherbrooke (CA); Paul Bruno Sylvain Camus, Annemasse (FR); Nadi Braidy, Sherbrooke (CA)

(73) Assignee: SOCIETE DE COMMERCIALISATION DES PRODUITS DE LA RECHERCHE APPLIQUÉE SOCPRA SCIENCES ET GÉNIE S.E.C., Sherbrooke (CA)

( * ) Notice: Subject to any disclaimer, the term of this patent is extended or adjusted under 35 U.S.C. 154(b) by 955 days.

(21) Appl. No.: 17/802,406

(22) PCT Filed: Feb. 26, 2021

(86) PCT No.: PCT/CA2021/050249
§ 371 (c)(1),
(2) Date: Aug. 25, 2022

(87) PCT Pub. No.: WO2021/168583
PCT Pub. Date: Sep. 2, 2021

(65) Prior Publication Data
US 2023/0182103 A1    Jun. 15, 2023

Related U.S. Application Data

(60) Provisional application No. 62/983,105, filed on Feb. 28, 2020.

(51) Int. Cl.
B01J 19/24        (2006.01)
B01J 12/00        (2006.01)
(Continued)

(52) U.S. Cl.
CPC ......... B01J 19/0093 (2013.01); B01J 12/007 (2013.01); B01J 19/0013 (2013.01);
(Continued)

(58) Field of Classification Search
CPC .. B01J 19/0093; B01J 12/007; B01J 19/0013; B01J 19/248; B01J 2219/00867;
(Continued)

(56) References Cited

U.S. PATENT DOCUMENTS 6,737,026 B1 *  5/2004  Bergh ..................... C07C 45/35
                                                    436/37
7,402,719 B2    7/2008  Brophy et al.
(Continued)

FOREIGN PATENT DOCUMENTS

DE        10325155 A1    12/2004
EP         1281922 B1 *  12/2005   ............... F25B 9/00
(Continued)

OTHER PUBLICATIONS

Camus et al., "Testing of a 3D-Printed Solar Micro-Reactor for Hydrogen Production via Natural Gas Reforming", Journal of Physics: Conference Series, vol. 1407 (2019), No. 012005, pp. 1-4.
(Continued)

*Primary Examiner* — Huy Tram Nguyen
(74) *Attorney, Agent, or Firm* — NORTON ROSE FULBRIGHT CANADA LLP

(57)        ABSTRACT
A micro-reactor for a reforming process has a cold side and a hot side opposite the cold side. Inlets are defined in the
(Continued)

cold side, the inlets configured for receiving reagents. An outlet is defined in the cold side, the outlet configured for exiting reforming products. A reforming chamber is in the hot side, the reforming chamber having a catalyst, the reforming chamber configured for reforming the reagents into the reforming products, the reforming chamber including channels extending toward an end surface on the hot side of the reforming chamber, and a return plenum. A reagent path is from the inlets to the reforming chamber, the reagent path configured to feed the plurality of channels with reagents. A reforming product path is from the reforming chamber to the outlet, the reforming product path configured to receive products from the return plenum.

20 Claims, 15 Drawing Sheets

(51) Int. Cl.
  *B01J 19/00* (2006.01)
  *C01B 3/384* (2026.01)
(52) U.S. Cl.
  CPC ............. *B01J 19/248* (2013.01); *C01B 3/384* (2013.01); *B01J 2219/00867* (2013.01); *B01J 2219/00885* (2013.01); *B01J 2219/2401* (2013.01); *C01B 2203/0233* (2013.01); *C01B 2203/0833* (2013.01); *C01B 2203/1005* (2013.01)
(58) Field of Classification Search
  CPC ...... B01J 2219/00885; B01J 2219/2401; B01J 2219/00788; B01J 2219/0081; B01J 2219/00835; B01J 2219/00873; B01J 2219/00887; B01J 2219/00943; C01B 3/384; C01B 2203/0233; C01B 2203/0833; C01B 2203/1005; C01B 2203/0238; C01B 2203/0811; C01B 2203/085; C01B 2203/0866; C01B 2203/0883; C01B 2203/1241; C01B 2203/16; C01B 3/48; C01B 3/38; Y02P 20/133; Y02P 20/141
  USPC ........................................................ 422/628
  See application file for complete search history.

(56) References Cited

U.S. PATENT DOCUMENTS

| | | | |
|---|---|---|---|
| 8,152,872 | B2 | 4/2012 | Woods et al. |
| 8,267,304 | B2 | 9/2012 | Pinchot |
| 9,192,929 | B2 | 11/2015 | Tonkovich et al. |
| 9,776,164 | B2 * | 10/2017 | Kamata .................. B01J 19/249 |
| 9,950,305 | B2 | 4/2018 | Wegeng |
| 2013/0025192 | A1 | 1/2013 | Wegeng et al. |
| 2018/0170750 | A1 | 6/2018 | Del-Gallo et al. |

FOREIGN PATENT DOCUMENTS

| | | | | |
|---|---|---|---|---|
| EP | 2708280 | A1 | 3/2014 | |
| JP | 2007190458 | A | 8/2007 | |
| WO | WO-0129435 | A1 * | 4/2001 | .............. F15C 1/146 |
| WO | WO-2019095067 | A1 * | 5/2019 | .............. C01B 3/38 |

OTHER PUBLICATIONS

R. Zheng et al., "Integrated Solar Thermochemical Reaction System for Steam Methane Reforming," Energy Procedia, vol. 69, pp. 1192-1200, may 2015.

V. I. Anikeev and V. A. Kirillov, "Basic design principles and some methods of investigation of catalytic reactors-receivers of solar radiation," Sol. Energy Mater., vol. 24, No. 1, pp. 633-646, Dec. 1991.

K. F. Jensen, "Silicon-Based Microreactors," in Microreactor Technology and Process Intensification ACS Symposium Series, vol. 914, No. 2, Cambridge, MA: American Chemical Society, 2005, pp. 2-22.

M. O'Connell et al., "The development and evaluation of microstructured reactors for the water gas shift and preferential oxidation reactions in the 5 kW range," Int. J. Hydrog. Energy, vol. 35, No. 6, pp. 2317-2327, Mar. 2010.

M. Grote et al., "Experimental and computational investigations of a compact steam reformer for fuel oil and diesel fuel," J. Power Sources, vol. 196, No. 21, pp. 9027-9035, Nov. 2011.

E. L. C. Seris, G. Abramowitz, A. M. Johnston, and B. S. Haynes, "Demonstration Plant for Distributed Production of Hydrogen from Steam Reforming of Methane," Chem. Eng. Res. Des., vol. 83, No. 6, pp. 619-625, Jun. 2005.

A. Gritsch, "Warmeintegrierte Reaktorkonzepte für katalytische Hochtemperatur-Synthesen am Beispiel der dezentralen Dampfreformierung von Methan," Ph.D. dissertation, Universitat Stuttgart, Stuttgart, Germany, 2008.

G. Kolb et al., "Fuel processing in integrated micro-structured heat-exchanger reactors," J. Power Sources, vol. 171, No. 1, pp. 198-204, Sep. 2007.

J. Xuan, M. K. H. Leung, D. Y. C. Leung, and M. Ni, "A review of biomass-derived fuel processors for fuel cell systems," Renew. Sustain. Energy Rev., vol. 13, No. 6-7, pp. 1301-1313, Aug. 2009.

G. Kolb, T. Braune, J. Schurer, and D. Tiemann, "Microstructured Plate Heat Exchanger Reactors for High Temperature Applications," Chem. Ing. Tech., vol. 85, No. 10, pp. 1619-1623, Oct. 2013.

* cited by examiner

14

131          134

INTEGRATED MICRO-REACTORS FOR HYDROGEN SYNTHESIS VIA METHANE REFORMING

CROSS-REFERENCE TO RELATED APPLICATION

The present application claims the priority of United States Patent Application No. _____, filed on Feb. 28, 2020, the contents of which are incorporated herein by reference.

TECHNICAL FIELD

The present disclosure relates to a system for harvesting solar energy to reform natural gas to synthesize hydrogen or a synthesis gas (e.g., CO and $H_2$).

BACKGROUND OF THE ART

Millions of metric tons of hydrogen are currently consumed every year in North America. In the next few years, hydrogen consumption is expected to grow. If produced from clean sources, hydrogen could even become an excellent energy carrier in the future, but today's hydrogen mainly comes from fossil fuels because of their low process requirements and high availability. Most of the commercially available hydrogen is currently produced by reforming natural gas. However, the necessary energy supply is provided by the combustion of an additional quantity of natural gas, which negatively impacts the production of hydrogen from an ecological standpoint.

Research groups have in the past demonstrated the feasibility of the concept of sun-assisted reforming. One known limitation of proposed technologies is that they require the use of expensive concentrators, such as satellite dishes, or require a host of auxiliary equipment such as heat exchangers. All of this increases capital costs, making the method unattractive given the low costs of natural gas currently in use.

SUMMARY

It is an aim of the present disclosure to provide technologies to improve the harvesting of renewable energy to reform natural gas to synthesize hydrogen or a synthesis gas.

In accordance with a first aspect of the present disclosure, there is provided a micro-reactor for a reforming process comprising a cold side and a hot side opposite the cold side, the reactor configured to be supported by the cold side, the hot side configured to be exposed to a heat source; inlets defined in the cold side, the inlets configured for receiving reagents; an outlet defined in the cold side, the outlet configured for exiting reforming products; a reforming chamber in the hot side, the reforming chamber having a catalyst, the reforming chamber configured for reforming the reagents into the reforming products, the reforming chamber including channels extending toward an end surface on the hot side of the reforming chamber, and a return plenum; a reagent path from the inlets to the reforming chamber, the reagent path configured to feed the plurality of channels with reagents; and a reforming product path from the reforming chamber to the outlet, the reforming product path configured to receive products from the return plenum.

Further in accordance with the first aspect, for instance, the channels are defined in fins, the fins being hollow.

Still further in accordance with the first aspect, for instance, ends of the fins contact a wall of the end surface of the chamber.

Still further in accordance with the first aspect, for instance, the fins are normal to the end surface of the chamber.

Still further in accordance with the first aspect, for instance, an inlet plenum is provided, the fins being in fluid communication with the inlet plenum.

Still further in accordance with the first aspect, for instance, the catalyst is in the return plenum.

Still further in accordance with the first aspect, for instance, filters are provided at ends of the channels.

Still further in accordance with the first aspect, for instance, the reagent path includes a plurality of parallel reagent passages extending from the inlet to the reforming chamber, the reforming product path includes a plurality of parallel product passages extending from the reforming chamber to the outlet.

Still further in accordance with the first aspect, for instance, the reagent path and the reforming product path are arranged for in a side by side intertwined arrangement.

Still further in accordance with the first aspect, for instance, the reagent path and the reforming product path are in a coil-shaped heat exchanger portion of the micro-reactor.

Still further in accordance with the first aspect, for instance, the inlets include a liquid manifold and a gas manifold, and the outlet includes a products manifold, the manifolds being in the cold side of the micro-reactor.

Still further in accordance with the first aspect, for instance, a vaporization portion is configured to receive liquid from the liquid manifold for producing steam.

Still further in accordance with the first aspect, for instance, a water-gas shift chamber is downstream of the reforming chamber.

In accordance with a second aspect of the present disclosure, there is provided a system of a plurality of micro-reactors comprising: a first set of the micro-reactors; at least a second set of the micro-reactors; a first reagent feed network in fluid communication with the first set of the micro-reactors; a second reagent feed network in fluid communication with the second set of the micro-reactors; and at least one controller to control independently a feed of reagent to the first reagent feed network and to the second reagent feed network.

Further in accordance with the second aspect, the micro-reactors may be as described in the first aspect.

In accordance with a third aspect of the present disclosure, there is provided a matrix of micro-reactors for a reforming process comprising: a plurality of micro-reactors, the micro-reactors including a cold side and a hot side opposite the cold side, the micro-reactors configured to be supported by the cold side, the hot side configured to be exposed to a heat source, inlets defined in the cold side, the inlets configured for receiving reagents an outlet defined in the cold side, the outlet configured for exiting reforming products, a reforming chamber in the hot side, the at least one reforming chamber having a catalyst, the reforming chamber configured for reforming the reagents into the reforming products, a reagent path from the inlets to the reforming chamber, the reagent path configured to feed the plurality of channels with reagents, and a reforming product path from the reforming chamber to the outlet, the reforming product path configured to receive products from the return plenum; a common structure, the micro-reactors being connected by the cold side to the common structure, the common structure having conduit networks configured to feed the inlets of the microreactors with reagents and configured to receive products from the outlets of the micro-reactors; wherein the hot sides of adjacent ones of the micro-reactors are separated by gaps.

Further in accordance with the third aspect, for instance, the gaps between adjacent ones of the micro-reactors define overlap portions.

Still further in accordance with the third aspect, for instance, electric heaters may have the hot sides of the micro-reactors.

Still further in accordance with the third aspect, for instance, the micro-reactors are according to the first aspect.

Still further in accordance with the third aspect, for instance, the micro-reactors are arranged in at least a first set and a second set, wherein the conduit networks include at least a first reagent feed network in fluid communication with the first set of the micro-reactors and a second reagent feed network in fluid communication with the second set of the micro-reactors; and at least one controller to control independently a feed of reagent to the first reagent feed network and to the second reagent feed network.

DETAILED DESCRIPTION

The present disclosure relates to a system for harvesting solar energy to reform natural gas to synthesize hydrogen or a synthesis gas (e.g., CO and $H_2$). It may rely at least in part on teachings of International Patent Application Publication No. WO 2019/095067, incorporated herein by reference. For instance, the micro-reactors described therein may be integrated at least partially in the systems of the present disclosure.

Figure 1:
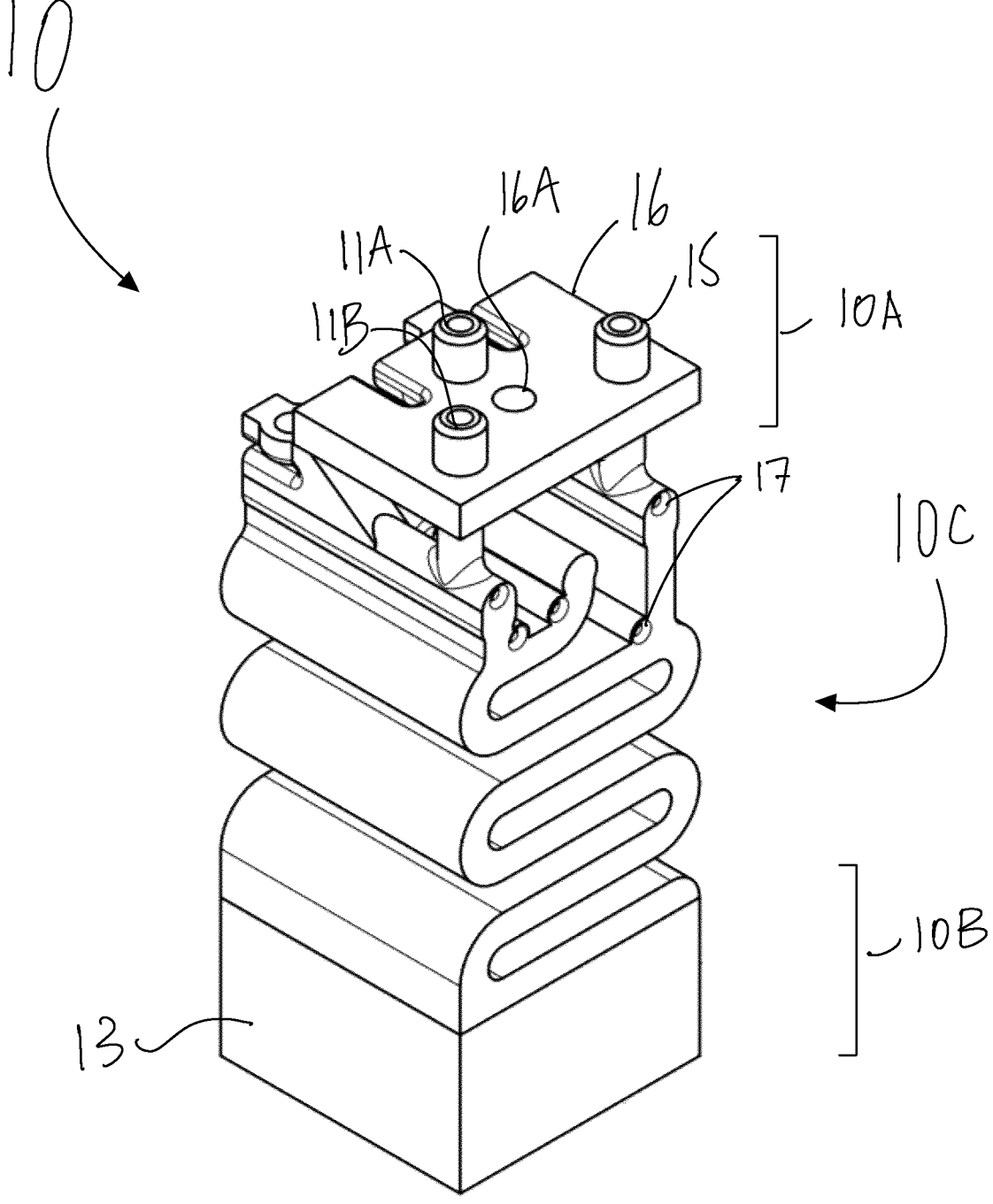
FIG. 1 is a perspective view of a micro-reactor in accordance with an aspect of the present disclosure.

Referring to FIG. 1, a micro-reactor in accordance with the present disclosure is generally shown at 10. The micro-reactor 10 is of the type that may be used in a reforming process, as part of an ensemble of micro-reactors 10, in manners described below. The micro-reactor 10 may include a cold side 10A by which it is connected to a manifold and a hot side 10B opposite the cold side 10A. The hot side 10B is exposed to a heat source, such as concentrated solar radiation, radiation by radiative electric heating elements, conduction by electric elements or any exothermic reaction. A counterflow heat exchanger portion 10C may be between ends of the cold side 10A and hot side 10B (4). The counterflow heat exchanger portion 10C allows the reactor 10 to preheat the reactants and recuperate excess heat from the products.

The expression "micro" is used as a moniker for the reactor 10, as the reactor 10 is of relative small size compared to other categories of reactors. While the expression "micro" should not limit the micro-reactor 10 to a particular size, the reactor 10 is typically sized so the width and length of the end surface 13D both ranges from 2 to 30 cm and the depth from hot side 10B to cold side 10A ranges from 5 to 50 cm. Other dimensions are possible.

Figures 2A, 2B:
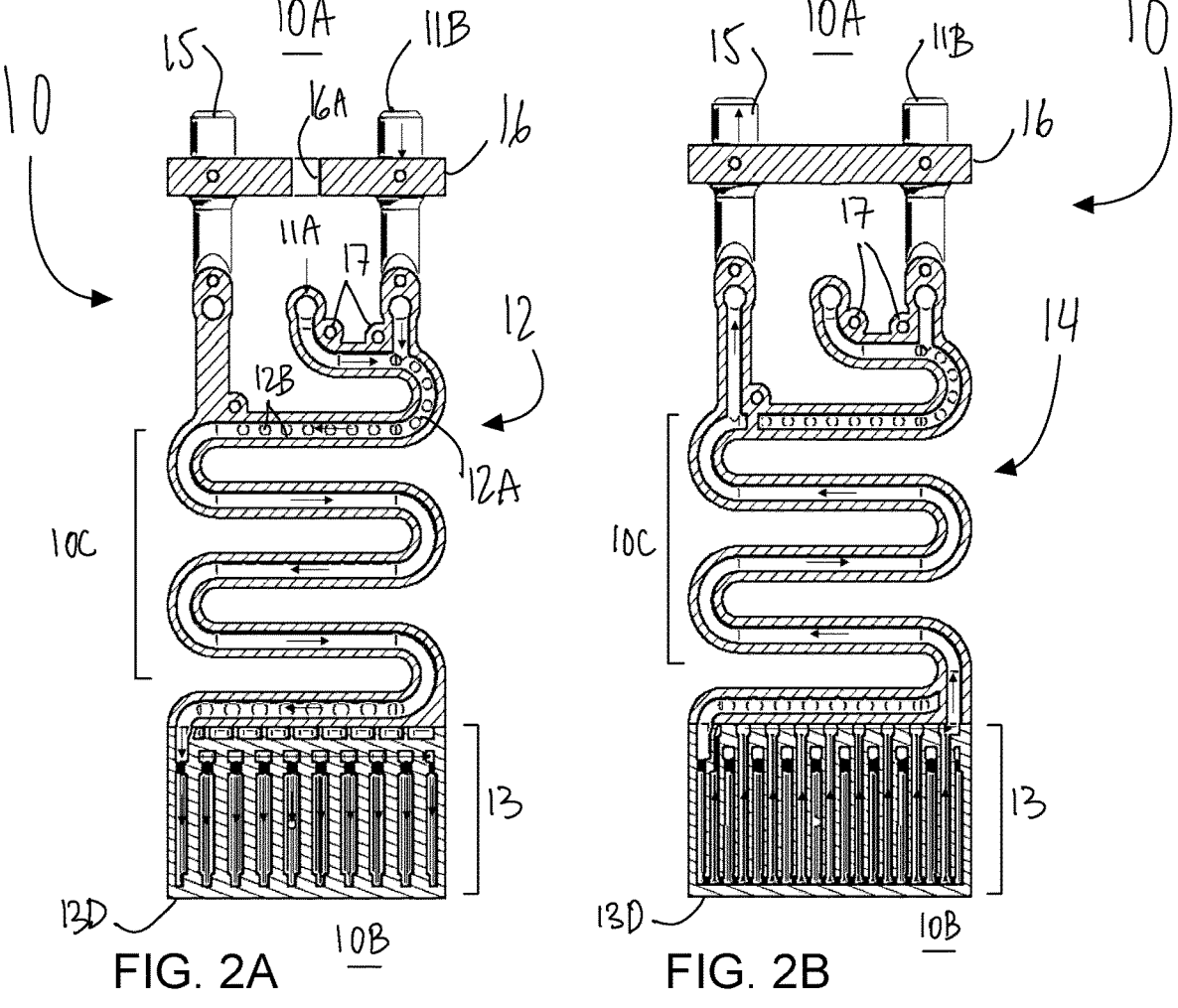
FIG. 2A is an elevation view, partly segmented, of the micro-reactor of FIG. 1, showing a reagent flow path.
FIG. 2B is an elevation view, partly segmented, of the micro-reactor of FIG. 1, showing a reforming product flow path.

Referring to FIGS. 1 and 2A, the reforming process is now explained relative to portions of the micro-reactor 10. Inlets 11 (shown as 11A and 11B) defined in the cold side 10A, the inlets for receiving reagents. For instance, liquid water may flow into inlet 11A, while a gas may flow into inlet 11B from the cold side 10A. In an embodiment, a reagent flow path to a reaction chamber is generally referred to as 12, and includes various zones (a.k.a., portions, sub-portions, sections). The inlets 11A and 11B may be in fluid communication with a vaporizer portion 12A. The vaporizer portion 12A may have heat exchanger portions 12B. Due to temperature in the vaporizer portion 12A, the water vaporizes in the vaporizer section 12A. A gas, such as methane in the case of SMR, is mixed with the water/steam in vaporizer portion 12A. The reagents, e.g., methane and water/steam then continue along a heat exchanger portion 12C in which, the reagents recuperate heat from the reagents exiting the micro-reactor 10, as the heat exchanger portion 12C shares a wall with a heat exchanger portion on the exit path.

Accordingly, heat may be absorbed before entering a reactor chamber(s) 13 packed with a catalyst (e.g., a SMR reactor chamber). The reactor chamber 13 may be referred to as a reforming chamber, and defines or is part of the hot side 10B of the micro-reactor 20. The reforming chamber 13 may include a reactor bed that contains the catalyst for a specific chemical reaction as well as the necessary features to ensure proper heat transfer between reagents and products. The reforming chamber 13 is configured for reforming the reagents into the reforming products The reagents may consequently be heated beyond a temperature threshold for reforming. The reforming reaction occurs at this point, with examples of reforming reactions being for example:

$$CH_4 + H_2O \rightarrow CO + 3H_2$$

$$CH4 + CO2 \rightarrow 2\ H2 + 2CO$$

The reforming reaction may be a combination of the two reactions given above, i.e., some proportion of dry methane reforming and some proportion of steam methane reforming.

Figure 3:
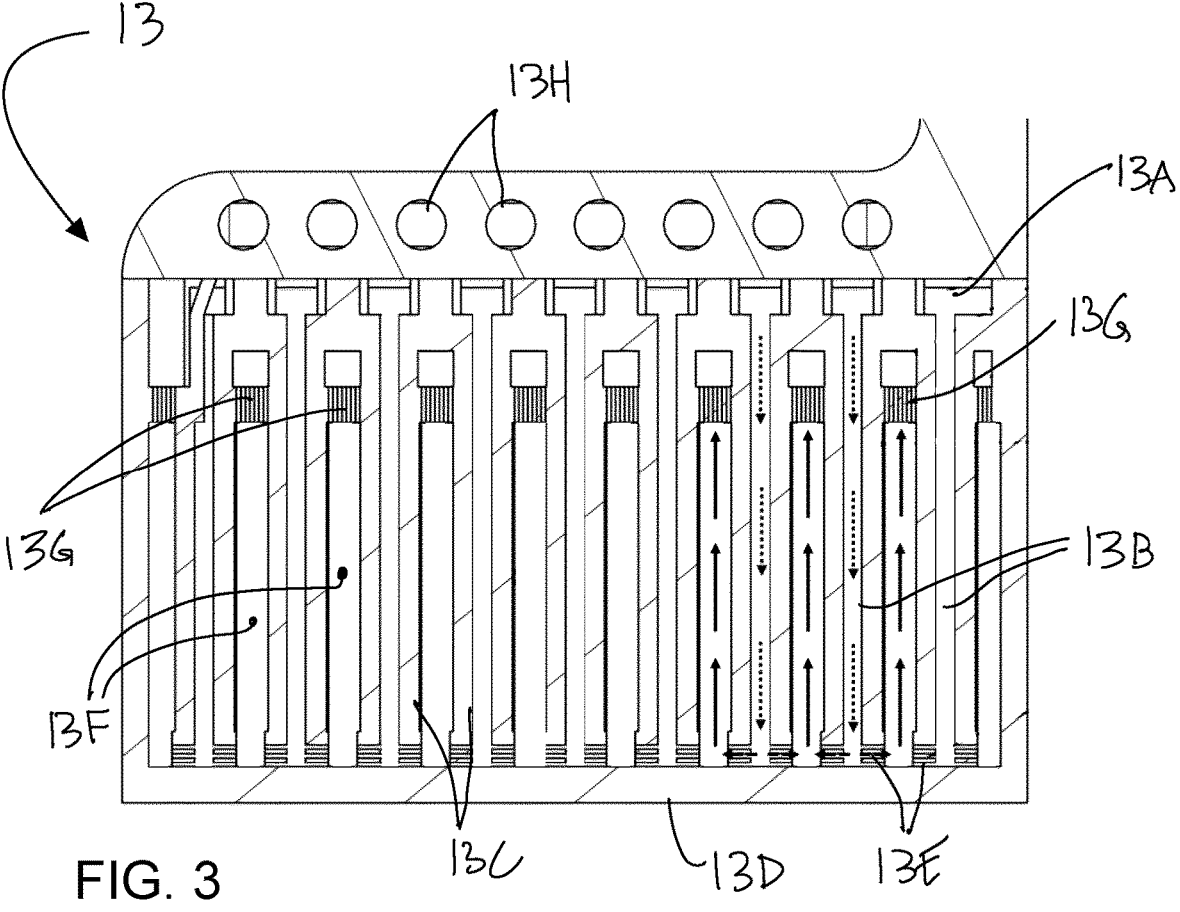
FIG. 3 is a sectional view of a reaction chamber of the micro-reactor of FIG. 1.

In FIG. 3, the reactor chamber 13 may be described as including a counterflow micro-reactor catalytic bed. A characteristic of the counterflow catalytic bed is that the reactants first flow in channels in a direction mainly toward the surface exposed to the heat source. Once they reach the exposed surface, the reactants change channels and flow back in a direction mainly away from the exposed surface. The catalyst can be located in the channels pointing toward the exposed surface or the channels pointing away from the exposed surface, or in both.

The catalyst may be inserted into the catalytic bed though holes on the side of the catalytic bed. The holes are plugged and/or welded after catalyst insertion to prevent leakage of the gas.

Figure 4A:
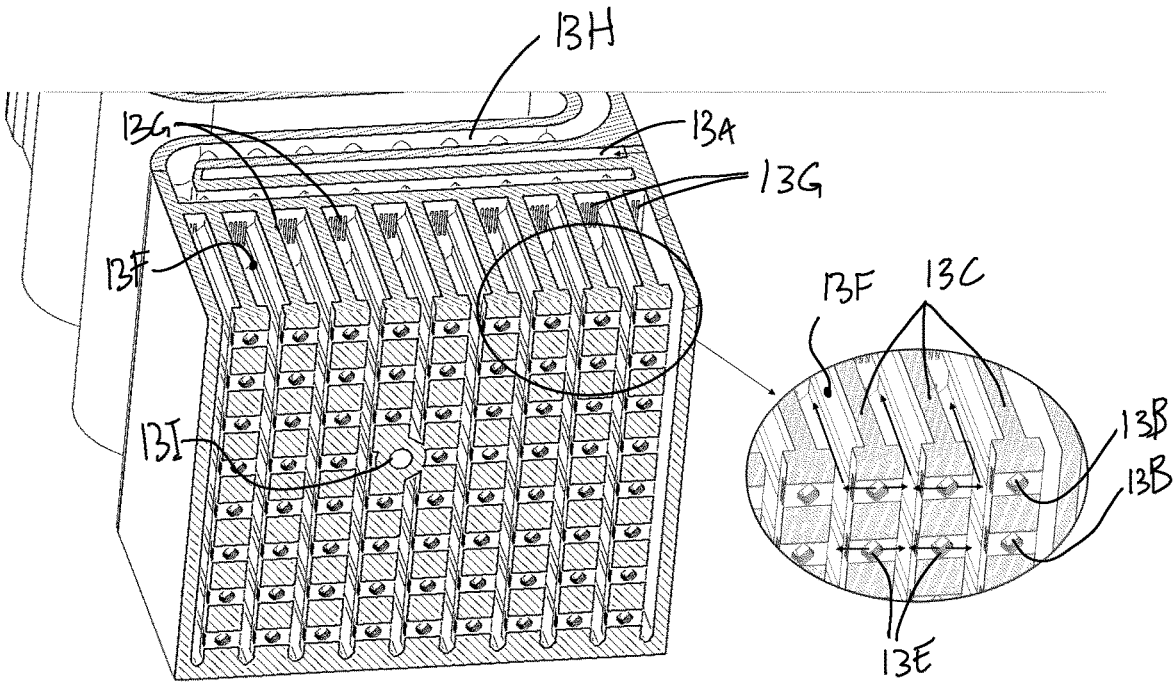
FIGS. 4A to 4C are views of the reaction chamber of the micro-reactor of FIG. 1.
Figure 4B:
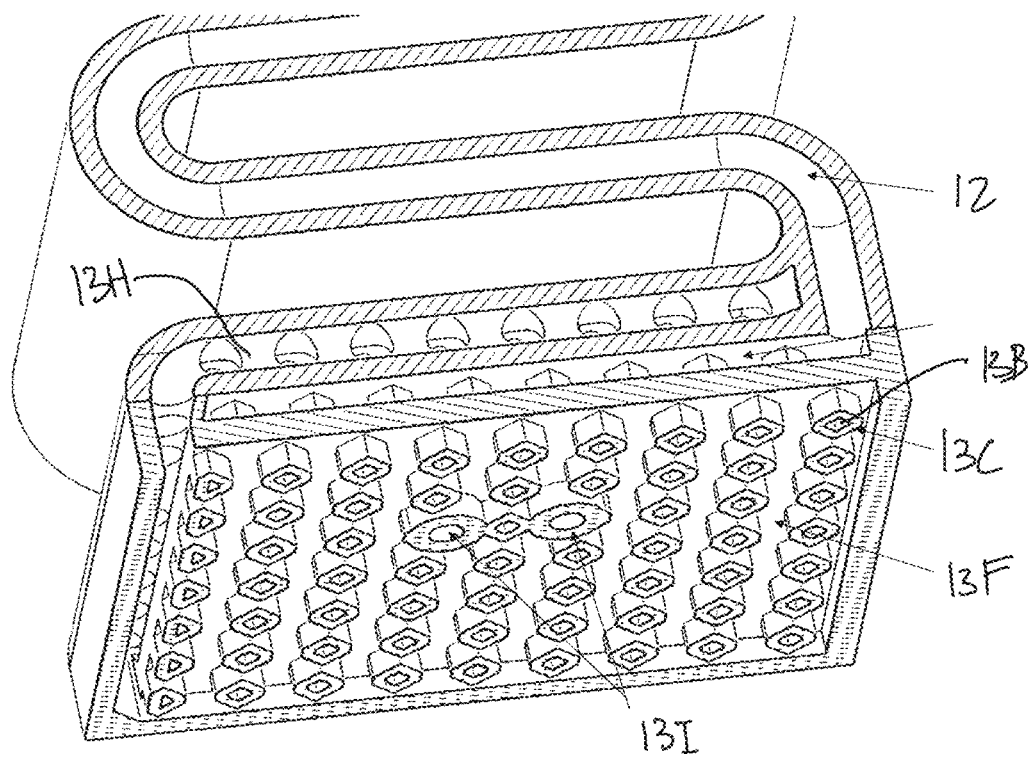
Figure 4C:
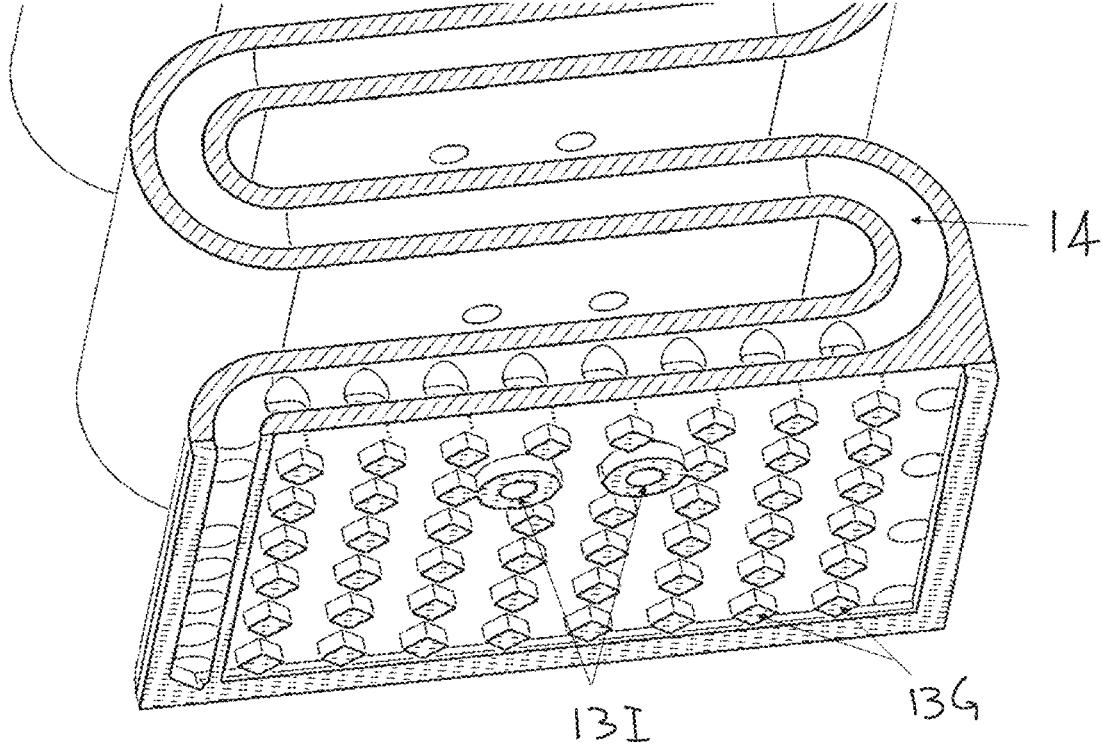

In one aspect, with reference to FIGS. 4A to 4C, the reactants enter the reactor bed of the chamber 13 from an inlet plenum 13A in the gaseous form. The reactants are spread in feed channels 13B defined by fins 13C (or like partitions) and flow towards the end surface 13D of the bed of the chamber 13, as shown by the arrows in dotted lines. The end surface 13D is the absorbing surface of the micro-reactor 10. The end surface 13D absorbs heat in a radiative form and transmits it through the bed by conduction and radiation. Upon reaching the end surface 13D of the bed, reactants pass through filters 13E. The filters 13E may for example be horizontal metallic filters. The filters 13E may be present to keep catalysts in the appropriate channels of the chamber 13. After passing through the filters 13E, the reactants reach the return plenum 13F, which may include catalyst to begin the chemical reaction (although the catalysts may also be in the channels 13B). The flow of reactants is converted into products, as the reactants go through the channels 13B and/or return plenum 13F (full line arrows). The products of the chemical reaction may then pass through filters 13G (e.g., vertical metallic filters). The filters 13G may be present to keep catalysts in the return channels 13F of the chamber 13. An exhaust plenum 13H may be present, with the products entering the exhaust plenum 13H to then exit the bed and the reactor chamber 13. The products may reach a reforming product path, generally referred to as 14 (FIG. 2B).

The channels 13B and the return plenum 13F may be defined by the fins 13C. Referring to FIG. 4A, the fins 13C may be hollow, post-like projections. The fins 13C are hollow and thus define the channels 13B, that open into the plenum 13F, in which the fins 13C extend. The fins 13C are in fluid communication with the inlet plenum 13A, for instance by passing through the exhaust plenum 13H. The fins or like walls or partitions 13C of the bed may have various functions: to conduct heat from the reactor end surface 13D upwardly (in the figure, but not necessarily related to a vertical axis in use), i.e., away from the end surface 13D. This heat conduction reduces the thermal gradient in the axis Y of the reactor bed and allows the "upper" part of the reactor bed in the chamber 13 to reach higher temperature to enhance the catalyst activity. The fins 13C may also act as counterflow heat exchangers to preheat the reactants in the feed channels 13B before being exposed to the catalyst, such as in the return plenum 13F. The fins 13C may also help in reducing sensible heat of the products to reduce process heat and improve efficiency.

The density of the fins 13C, i.e., their size parameters vis à vis the size of the chamber 13, can be adjusted to increase or decrease heat conduction through the bed, by defining the dimensions of the channels 13B and plenum 13F. This adjustment can be made as a function of the process, for instance to accommodate catalysts with different activity and heat conductivity. The return plenum 13F is the space surrounding the fins 13C, in which catalyst is present. The return plenum 13F may be the primary process reaction section of the micro-reactor 10, in that the majority of the reforming may occur in the return plenum 13F. While the above embodiment shows the fins 13C as being shaft-like projections, the feed channels 13B may be straight walls as a possibility. The return plenum 13F may be the cavity of the chamber 13, excluding the fins 13C that project to the bottom of the chamber 13.

If present, the inlet and exhaust plenum 13A and 13H, respectively, have the function of distributing reactants across the reactor chamber 13, for instance to reduce thermal gradient in the bed of the reactor chamber 13. They may be directly manufactured within the reactor to reduce space and heat loss. As observed in FIG. 4A, thermocouple supports 131 may be defined in the chamber 13, to measure the temperature of the process.

The filters 13E and 13G may also be directly manufactured in the reactor chamber 13. Their function is to allow the gas to flow through them while preventing the catalyst particles from passing through them. Since the architecture of the filters 13E and 13G acts like a sieve, their size and shape can be adjusted for different sizes of catalyst particles.

Figure 2C:
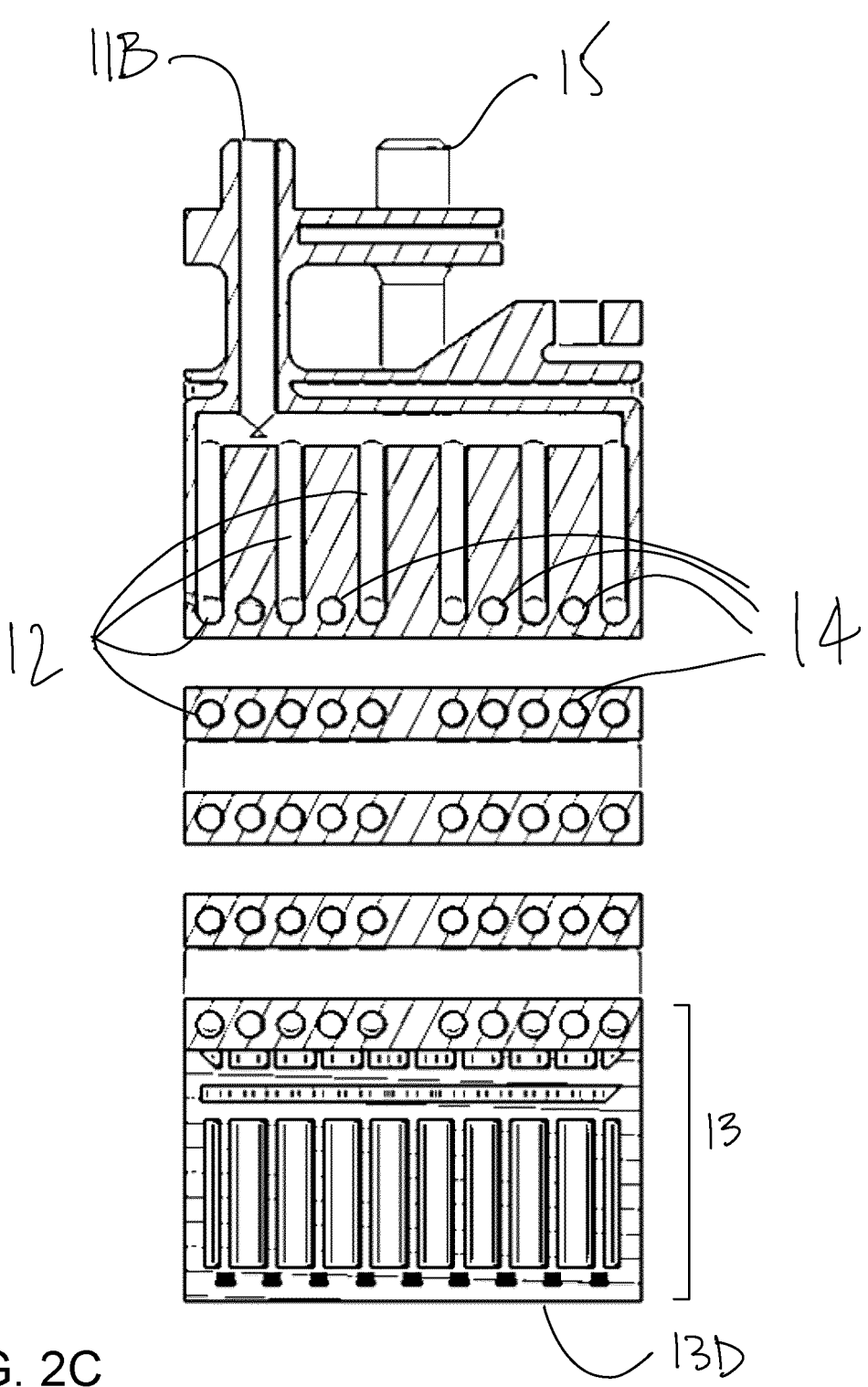
FIG. 2C is a side elevation view, partly fragmented, of the micro-reactor of FIG. 1, showing an interrelation between reforming product flow path and reagent flow path.

Referring to FIGS. 2B and 2C, the reforming products then exit the chamber 13 to enter a reforming product path, generally referred to as 14, from the chamber 13 to outlet 15. Looking at FIG. 2C, a plurality of paths 12 may be intertwined with reforming product paths 14, in counterflow arrangement, for heat exchange to occur between the reagents and the products (i.e., in an alternative sequence, 12, 14, 12, 14, . . . , in a width of the heat exchanger portion 10C). In the intertwined arrangement, the reagent flow path 12 and the reforming product path 14 respectively feed and are fed by the chamber 13. As observed, the fluid part portions 12 and 14 are back to back, and share a wall for heat exchange between the reagents and the reforming products, as described below.

In the reforming product path 14, the reforming products may cool down in a heat exchanger portion mirroring that of the reagent flow path 12. Other portions may be present, depending on the type of reagents and process, such as a water-gas shift (WGS) reactor portion. The WGS reactor portion may be present to reoxyde the CO, according to the following reaction:

$$CO+H_2O \rightarrow CO_2+H_2.$$

The WGS reactor portion may be optional, as it may not be required to reoxyde the CO in the micro-reactor 10. The generated heat in the WGS reactor portion as well as a part of the sensible energy is then used to vaporize the inflow of water. The gas may finally passes through a low temperature heat exchanger portion where it releases energy to preheat the liquid water in the vaporizer portion 12A, by heat exchange via the heat exchange portions 12B and/or as the vaporizer portion 12A and the heat exchanger portion are aligned (i.e., back to back). The remaining energy needed to vaporize water comes from the conduction inside the micro-reactors 20's walls and exposure to warm ambient temperature/or and local radiant energy. Syngases exit the micro-reactor 20 via the outlet 15.

In the micro-reactor 10, natural gas and water may be preheated separately in an economizer and water is vaporized at the top of the reactor 10. In a set up, low temperature electrical heating elements may be used to preheat and vaporize the water before entering the reactor and the manifold. In the case of dry methane reforming, the reactant gas may not need to be pre-heated. The steam and natural gas (e.g., methane) are then mixed in heat exchanger portion 10C which will bring the reactive mixture to a high temperature, such as over 850° C. The hot mixture then circulates through a bed of catalyst in the reactor chamber 13, where the hydrogen separates from the natural gas and water to create a mixture of hydrogen and carbon monoxide, i.e. syngas. The syngas is cooled a first time by passing through the heat exchanger portion 10C where it leaves part of its energy to the reactants, after which it may enter a second catalyst bed where the carbon monoxide in the mixture is oxidized to $CO_2$, releasing more hydrogen from the vapor remaining in the mixture. The energy released by this exothermic reaction is mostly consumed by the vaporizer in the head of the reactor 10. Finally, the gas containing hydrogen and carbon dioxide releases the remainder of its thermal energy in the economizer to exit the reactor 10, at a low temperature, such as near room temperature. Part of the necessary heat flow may be transmitted through ribs along the reactor specifically sized for this purpose.

In an embodiment, the entire micro-reactor 10 is contained in a single metal plate less than 2 mm thick. The simplicity of the design allows a series of identical plates to be manufactured at low cost and high volume by processes such as punching and chemical etching. These autonomous micro-reactors are then stacked and joined by diffusion bonding to create a stack of reactors with increased capacities. This architecture enables the achievement of a sophisticated three-dimensional network of circuits and micro-reactors operating in parallel, promoting heat exchanges, thus promoting process efficiency.

Figure 5:
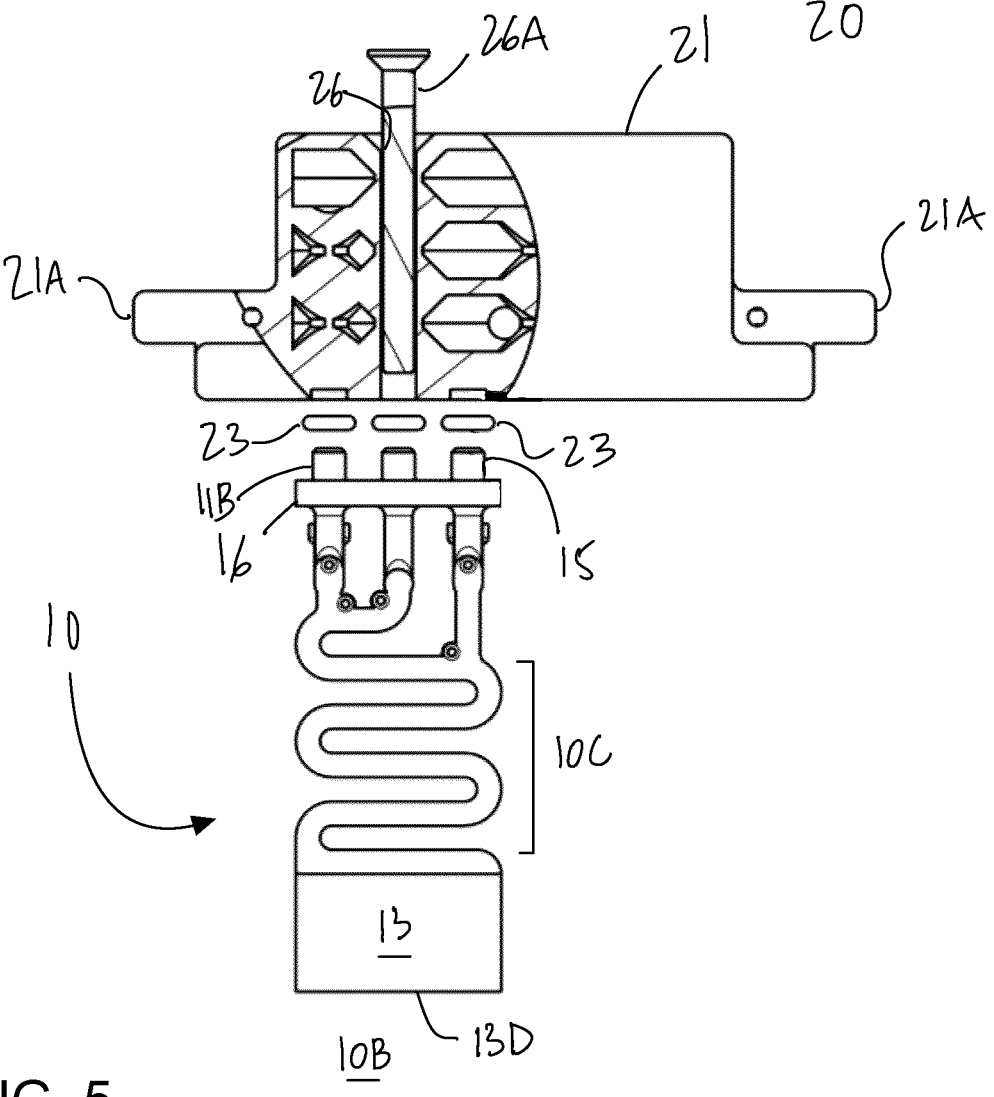
FIG. 5 is an elevation assembly view, partly segmented, of the micro-reactor of FIG. 1 relative to an exemplary manifold.
Figure 6:
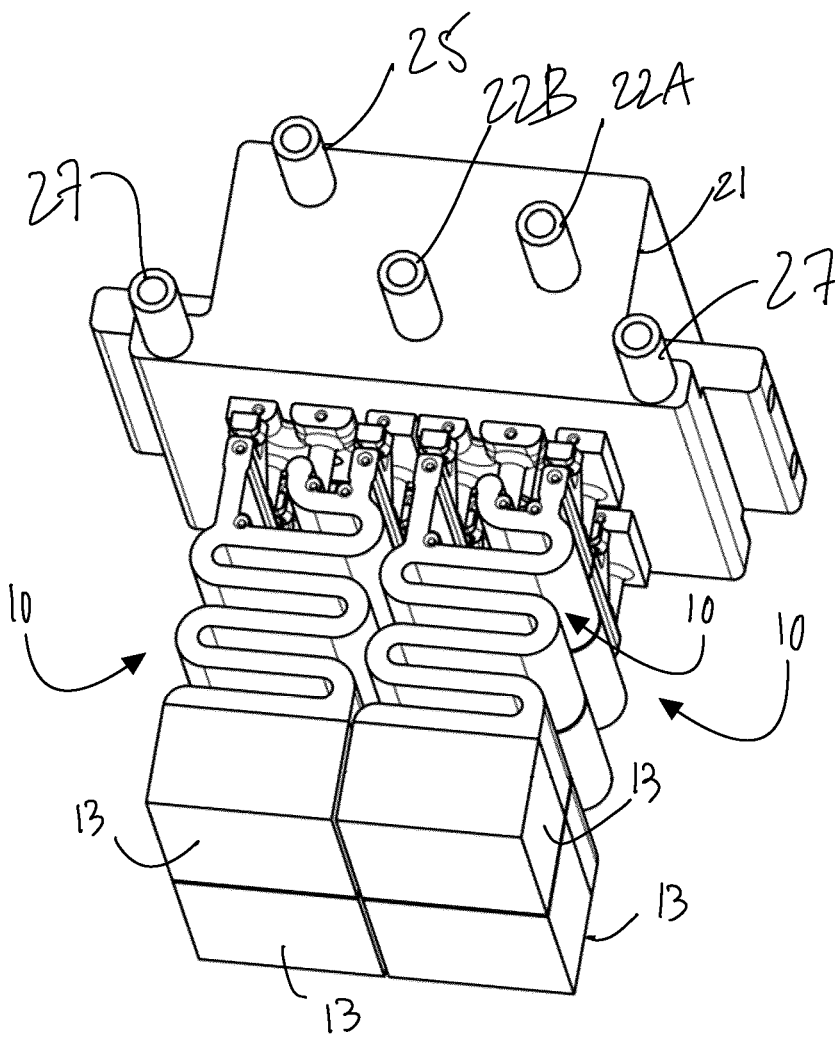
FIG. 6 is a perspective view of a 2×2 matrix of the micro-reactor of FIG. 1, mounted on a manifold to form a square receiver.

Referring to FIGS. 1, 5 and 6, in an embodiment, the inlets 11A, 11B (concurrently, 11) and the outlet 15 are pipe portions (a.k.a., tubes, tubing) that project upwardly at the cold side 10A of the micro-reactor 10. An attachment plate 16 with attachment bore 16A may be present, as one option among others to secure the micro-reactor 10 to a manifold 20 (brackets, clips, etc, being other options). In an embodiment, the connection of the inlets 11 and outlet 15 to the manifold 20 suffices in having the micro-reactor 10 secured to the manifold 20. In an embodiment, the inlets 11 and outlet 15 have central axes parallel to one another. Vectors of the central axes may normal to a plane of the attachment plate 16. As other optional features, eyelets 17 may be present in the micro-reactor 10 for thermocouples, or like sensors.

Referring to FIGS. 5 and 6, an example of the manifold 20 is shown. The manifold 20 may have a structure 21 or substrate, or any appropriate shape. Examples are given of various micro-reactor set ups in FIGS. 11 to 13, with the structure 21 playing a role in giving the set ups their shapes. The structure 21 may have a square shape for the 2×2 matrix of FIG. 5, may be a plate for the arrangement of FIGS. 11 and 12, or cylindrical for the arrangement of FIG. 13. Other shapes are contemplated, including strips, bands, etc. The structure 21 may for example have flanges 21A for interconnection with other manifolds 20, or surrounding structure.

Conduits concurrently referred to as 22 may extend through the structure 21, and have branches by which they may be connected to the micro-reactors 10. More precisely, conduit 22A may be part of the network feeding inlets 11A, conduit 22B may be part of the network feeding inlets 11B, and conduit 25 may be part of the collecting network receiving the products from the outlet 15. Seals 23, such as O-rings, may be provided at the junction between the branches of the conduits 22 and 25 and the inlets 11 or outlet 15 to ensure a sealed connection. For example, the seals 23 are received in the illustrated counterbores. Other connection features may be present, such as male/female fittings, nipples, etc.

Referring to FIG. 5, a connection bore 26 may be defined in the structure 21, for receiving a fastener 26A, The fastener 26A may be operatingly received in the attachment bore 16A of the plate 16 of the micro-reactor 10, as one contemplated solution to secure the micro-reactor 10 to the structure 21 of the manifold 20, with the inlets 11 and outlet 15 respectively in fluid communication with the conduits 22 and conduit 25. The fastener 26A may be a screw, a bolt, etc, with the attachment bore 16A being correspondingly threaded. To ensure a good alignment of the reactor, alignment features may also be present, such as alignment pin(s) on the micro-reactor 10. Though other ways are contemplated to connect the micro-reactor 10 to the structure 21, the configuration shown in such that the assembly/disassembly of a single reactor is independent of its surroundings reactors 10. Therefore, a reactor can be installed or removed without the need to touch the other reactors 10. The independent connection of micro-reactors 10 to the structure 21, while not being optional, may facilitate the maintenance of a receiver set up.

The assembly of the reactors 10 to the manifold 20 can be done using a simple sealing plate (e.g., plate 16) attached to each reactor 10, for example, and allowing local and easy assembly, which facilitates integration and maintenance. Assembly can also be done by integrating quick-connect type connectors into each inlet port, to facilitate maintenance and assembly.

Referring to FIG. 6, in an embodiment, cooling conduit(s) 27 may be provided. A coolant may circulate in the cooling conduit(s) 27, so as to control a temperature of the structure 21. Four micro-reactors 10 are arranged in a matrix of on the structure 21 to form a 2×2 square receiver. As observed, the micro-reactors 10 are separated from one another by gaps. The size and shape of the structure 21 as well as the number of micro-reactors 10 can be varied, from a few to tens of thousands, to create a receiver adapted to the size, power and shape of the available energy source.

Figures 7, 8:
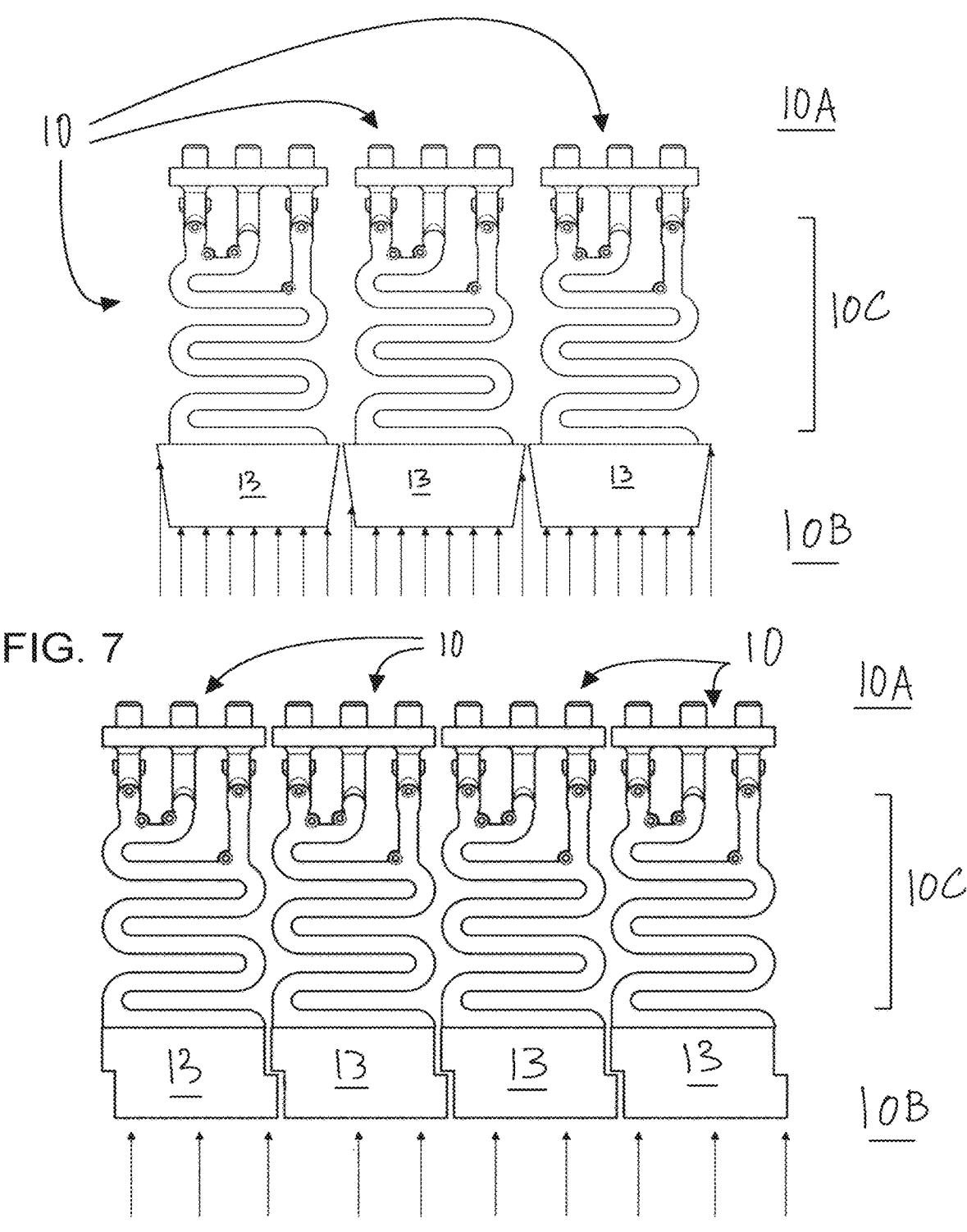
FIG. 7 is an elevation view of a set of the micro-reactor of FIG. 1 in a side-by-side arrangement, illustrating a hot side configuration.
FIG. 8 is an elevation view of a set of the micro-reactor of FIG. 1 in a side-by-side arrangement, illustrating another hot side configuration.

Referring to FIGS. 7 and 8, two outer geometries are shown for the hot side 10B of the micro-reactors 10, and more particularly for the chambers 13. In FIG. 7, a cross section of the chamber 13 is trapezoid, so as to limit the size of a gap between adjacent chambers 13. In FIG. 8, an overlap joint is formed between adjacent chambers 13, by the presence of steps. In the various illustrated embodiments, including that of FIG. 6, the presence of gaps allows freedom of movement between adjacent chambers 13, so as to avoid mechanical stresses in spite of thermal expansion. The various arrangements of FIGS. 6-8 are provided to reduce gap size, so as to limit energy losses for instance by radiant heat to pass through the gaps. The overlap joints of FIG. 8 is particularly well suited as the adjacent chambers 13 may form an undisrupted surface for capturing radiant heat.

Hence, the gap between the adjacent micro-reactors 10 may serve for various purposes: the gaps may allow thermal expansion of the parts of the micro-reactors 10 to reduce thermal stresses on the reactors 10; the gaps may facilitate maintenance and installation of a matrix set up by facilitating access to individual reactors 10 without the need to move neighbouring reactors 10; and/or, the gaps may allow radiant heat (e.g., sunrays) to penetrate to different depths of the reactor 10 to provide direct radiative heat for subprocesses like vaporizing water in the preheating reactants. Radiation can be absorbed directly on the end surface 13D of the reactor chamber 13 or by any other surface, such as lateral surfaces located in the gap between the reactor chambers 13.

The micro-reactor 10 may include any of its subcomponents such as the connecting plate 16, inlets 11 and outlet 15, heat exchanger portion 10C, plenums 13A and 13H, fins 13C, filters 13E and 13G and all absorbing surfaces, such as 13D, all of which may be manufactured in a monolith block or blocks, by additive manufacturing, such as direct metal laser melting (DMLM) or metal binder jetting (MBJ). The DMLM and MBJ process can be adapted to different materials such as Inconel or stainless steel to manufacture reactors with different mechanical and thermal properties. Other manufacturing techniques are contemplated.

Figure 9:
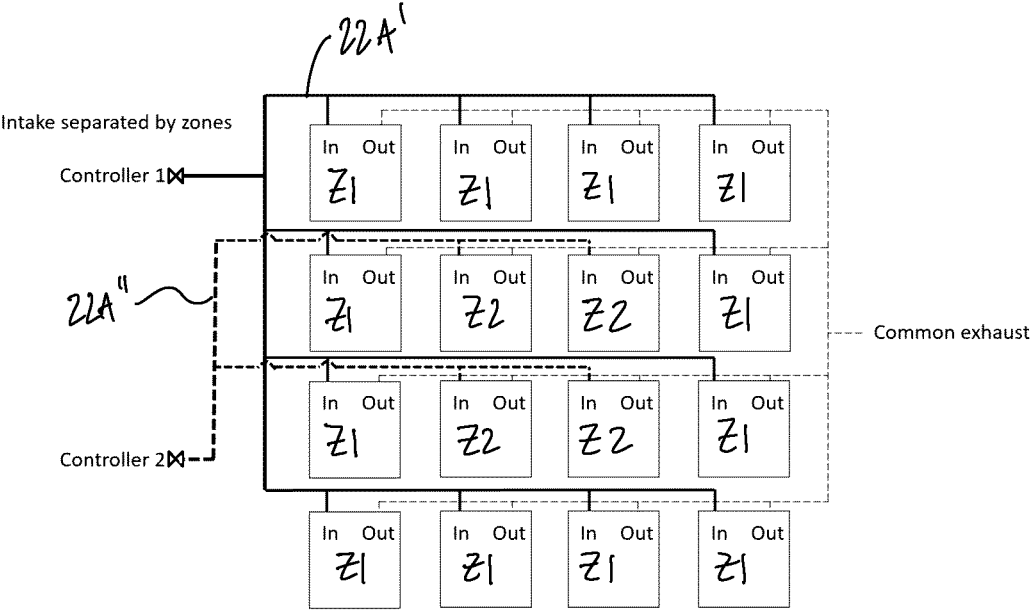
FIG. 9 is a schematic view of a configuration of micro-reactors with control by zone of temperature in accordance with another aspect of the present disclosure.

Referring to FIG. 9, a configuration of micro-reactors is shown, with the micro-reactors being for example the micro-reactors 10 described above, or other reforming reactors, such as those of International Patent Application Publication No. WO 2019/095067. The micro-reactors 10 are part of a receiver, such as the ones shown in FIGS. 6 and 10-13. The receiver has the capacity of being controlled by zone of temperature, with micro-reactors of a first zone by labelled as Z1 and micro-reactors of a second zone by labelled as Z2. The micro-reactors of zone Z1 have a common feed conduit 22A', with the micro-reactors of zone Z2 have a common feed conduit 22A". In the example of FIG. 9, the feed gas of the reactors 10 of zone Z2 are controlled by controller 2 (e.g., via a valve), whereas the feed gas of the reactors 10 of zone Z1 in a periphery of the receiver are controlled by controller 1 (e.g., via a separate valve). All micro-reactors may be connected to a common output network, or may have dedicated conduits as well. With a common output network, the exhaust gas of all reactor of the receiver may be jointly gathered to simplify any post-processing of the gas. With this configuration, the two zones Z1 and Z2 could operate at different incident heat flux and different gas feed, or one zone may be shut off while another is operational. The receiver may have more than two zones, with the zones distributed as a function of the exposure to radiant heat. The controllers 1 and 2 may include a set of valves, a processing unit, various sensors such as temperature and/or pressure sensors, to determine the operating parameters of the zones. Controllers 1 and 2 may be sub controllers, or a module of a common controller unit for the receiver. Stated differently, the operation of the zones may be individually controlled. Each zone can thus be composed of different reactors 10 to optimize the efficiency of the process. For example, if the zone Z1 controlled by controller 1 typically receives less heat flux than zone Z2, then the reactors 10 installed in this zone Z1 can be low flux reactors and the reactors 10 of zone Z2 which typically receive more heat flux can be high flux reactors. For instance, for high flux versus low flux, the reactors 10 could also use different catalysts as a function of their zone for various selectivity to match various applications. The temperature control of the reactor matrix can be done by modifying the flow of reagents passing through each zone and/or by heating this zone electrically, for example, which allows the system to operate at the optimum temperature in its entirety.

In order to standardize the temperature between the reactors forming the matrix, the flow rate of reactants can be modulated from one reactor to another, since the flow rate directly affects their temperature for the same heat flux. In one implementation, valves are operated in active control based on temperature measurement using a thermocouple. In an alternative implementation, the valves are passive and actuate naturally with temperature (thermostatic). These valves are integrated directly into the reactors, in the passive case, or can be integrated into the gas distributor, in the active case, i.e. as part of the controllers. To summarize, the system of FIG. 9 may be applicable to receivers as described herein, and may include a first set of the micro-reactors; at least a second set of the micro-reactors; a first reagent feed network (of one or more conduits e.g., 22A and 22B) in fluid communication with the first set of the micro-reactors; a second reagent feed network (of one or more conduits e.g., 22A and 22B) in fluid communication with the second set of the micro-reactors; one or more controller to control independently a feed of reagent to the first reagent feed network and to the second reagent feed network. The controller may include a processing unit, and a non-transitory computer-readable memory communicatively coupled to the processing unit and comprising computer-readable program instructions executable by the processing unit for independently feeding the zones.

Figure 10:
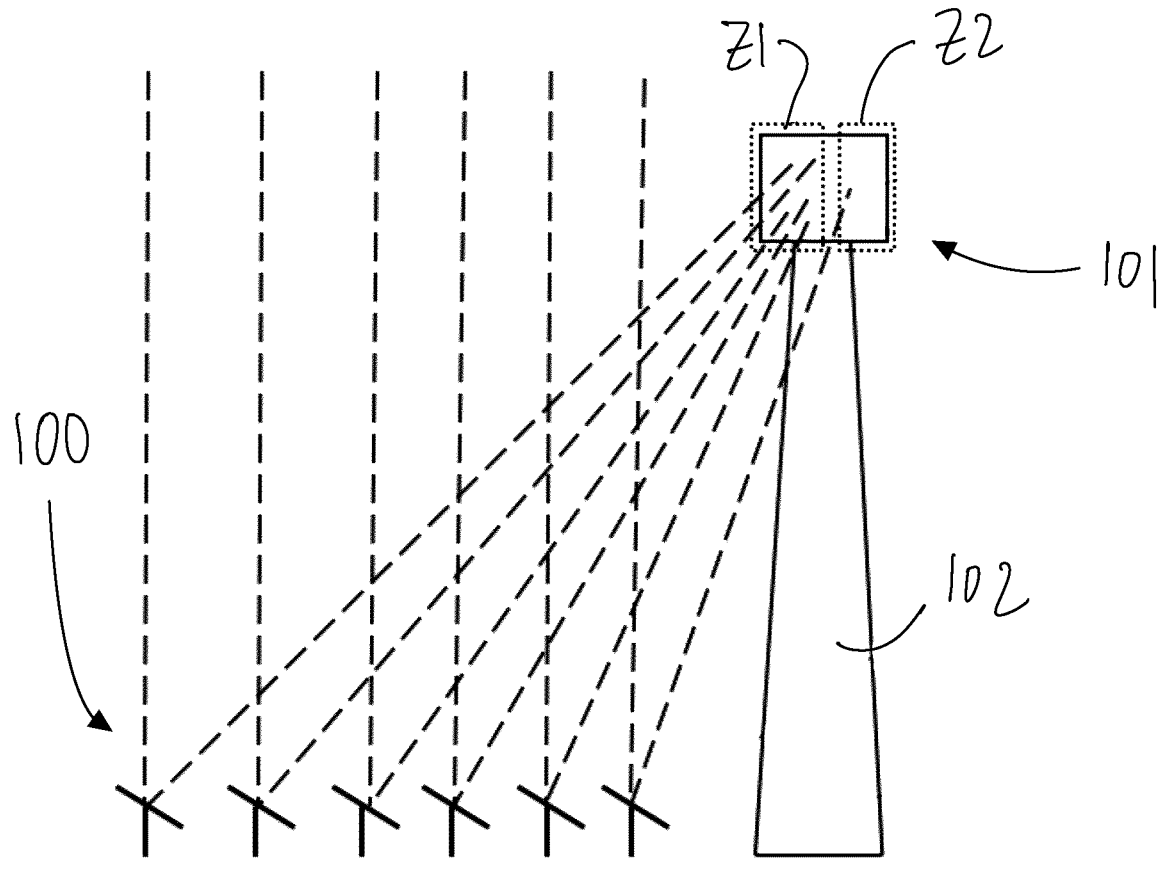
FIG. 10 is a schematic view of a heliostat field concentrating sunrays on a receiver made of multiple micro-reactors separated by zones in accordance with another aspect of the present disclosure.

Referring to FIG. 10, a schematic view of a heliostat field 100 is shown, concentrating sunrays on a receiver 101 incorporating a matrix of micro-reactors (such as the micro-reactors 10), located on top of a solar tower 102. The receiver 101 can be separated by zones Z1 and Z2 (though more zones could be present) by controlling an aiming point of each heliostat. In FIG. 10, the left zone of the receiver 101 is the target of most of the heliostats. It is therefore a high heat zone compared with the right side of the receiver 101 which receives less power, and hence is a low heat zone.

The individual control of each heliostat allows the control of the heat flux incident on the reactors in the zones Z1 and Z2. This may enable the precise control of the temperature of the reactors according to varying environmental conditions such as clouds, dust, defect of a heliostat, etc. In the event of a large cloud shading half of the solar field, a zone of the receiver 101 could be totally shutdown and all the remaining rays redirected to a working zone of the receiver 101 without compromising the efficiency and functionality of the reactors.

Figure 11:
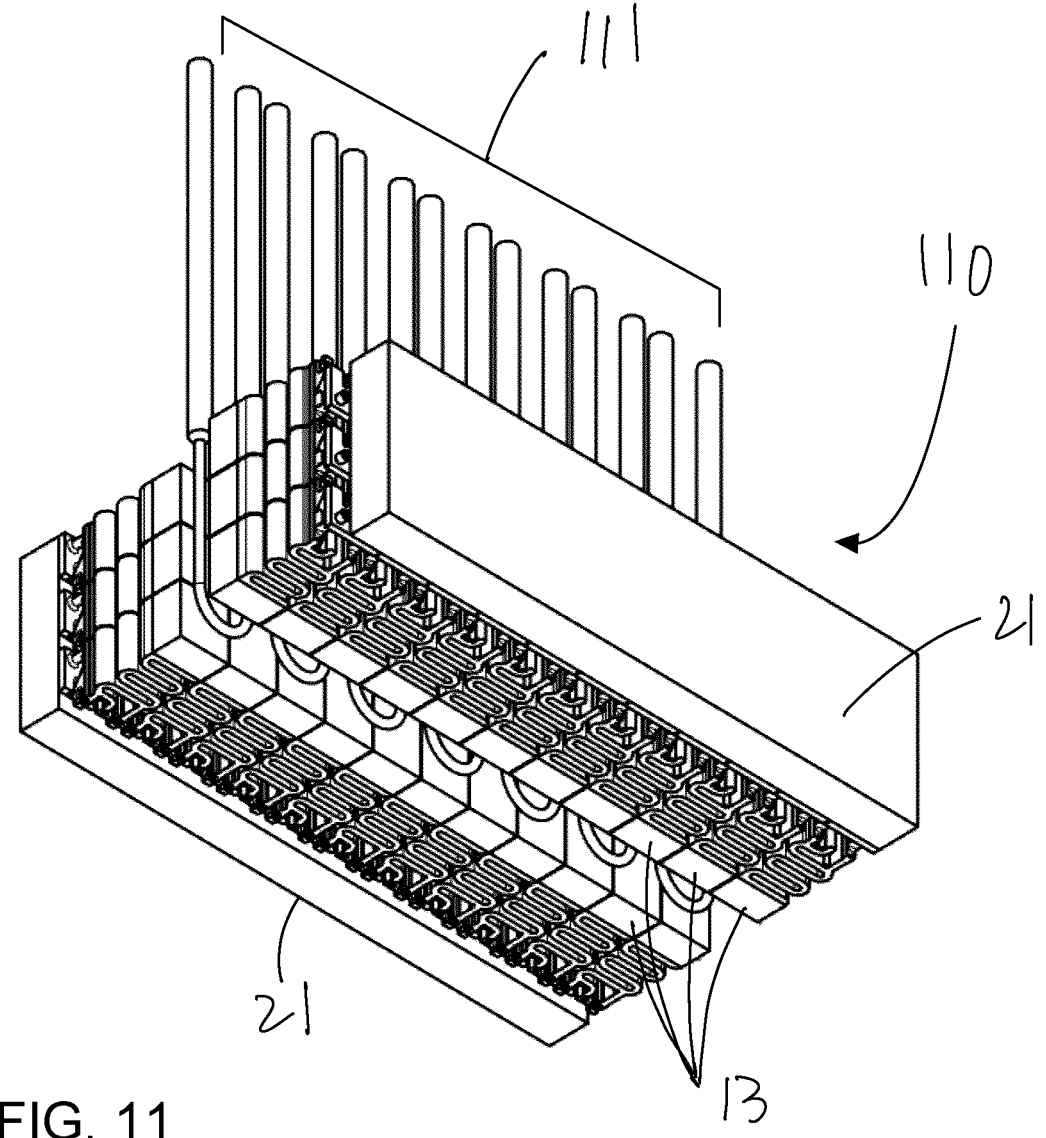
FIG. 11 is a perspective view of a receiver featuring two sets of micro-reactors with common electric heaters in accordance with another aspect of the present disclosure.

Referring to FIG. 11, a receiver 110, or a pair of receivers, share a common heat source, in the form of an electric heater(s) 111. The heater(s) 111 may be electrically powered resistive coil(s), or may have a heating fluid therein, such as oil. If a chemical exothermal reaction is used to power the reactors, there would be no heating elements. Heat would be provided by combustion of gas, such as natural gas, for example. Parts or all of the heater 111 may be powered, i.e., power supply to the heater(s) 111 may selectively be done. In FIG. 11, two matrices of multiple micro-reactors, such as the micro-reactors 10, face each other and are heated by the multiple radiative electric heating elements 111. In this embodiment, each matrix of multiple micro-reactors (e.g., shown as two 3×11 matrices, but with other arrangements possible) share a common heat source. Each micro-reactor is free to move relative to the other and relative to the heat source to allow thermal expansion and reduce mechanical stresses. The heaters 111 are also free to more relative to one another. Each micro-reactor is supported by structure 21 that provides mechanical, thermal and fluidic connection to the micro-reactors, while also interfacing the micro-reactors to the rest of the receiver (not shown in FIG. 11).

The heat source can provide energy to the matrices of multiple micro-reactors by means of radiation, conduction, convection or a combination of any or all of these heat transfer mechanisms. The heating element(s) 111 can be electrically powered, or an exothermic chemical reaction may be performed. There can be heating elements shared by multiple reactors, or a single heating element may be dedicated to a given reactor or set of reactors. In the receiver of FIG. 11, the flow through the micro-reactors can be controlled by zones of the matrix in the manner shown by FIG. 9, or individually.

Figure 12:
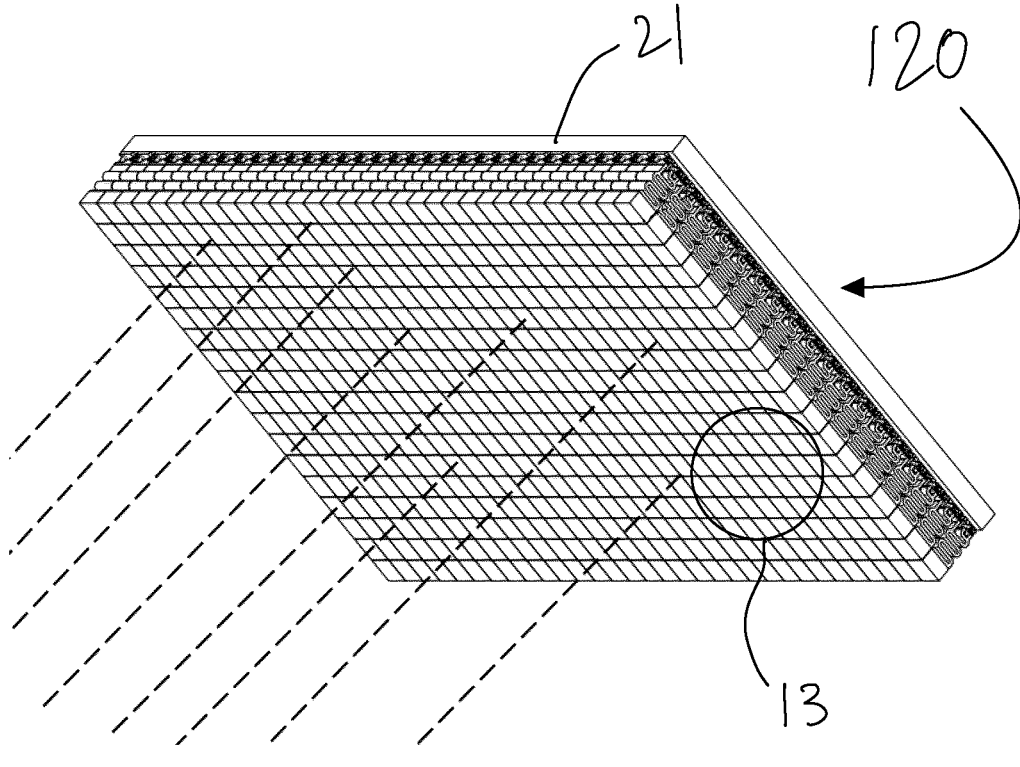
FIG. 12 is a perspective view of a flat plate receiver of micro-reactors in accordance with another aspect of the present disclosure.

FIG. 12 illustrates one configuration of a flat receiver 120 made of hundreds of micro-reactors (such as the micro-reactors 10) working in parallel, the micro-reactors being parallel among each other and/or in parallel zones (as in FIG. 9). The receiver 120 may be located on top of a tower to absorb concentrated solar irradiation reflected from a heliostat field located on the ground, or from other sources such as electrical heaters. Each reactor may be is individually assembled and sealed to the structure 121. The structure 121 distributes chemical reactants to each of the reactors and collects the chemical products at the exhaust of each reactor.

Figure 13:
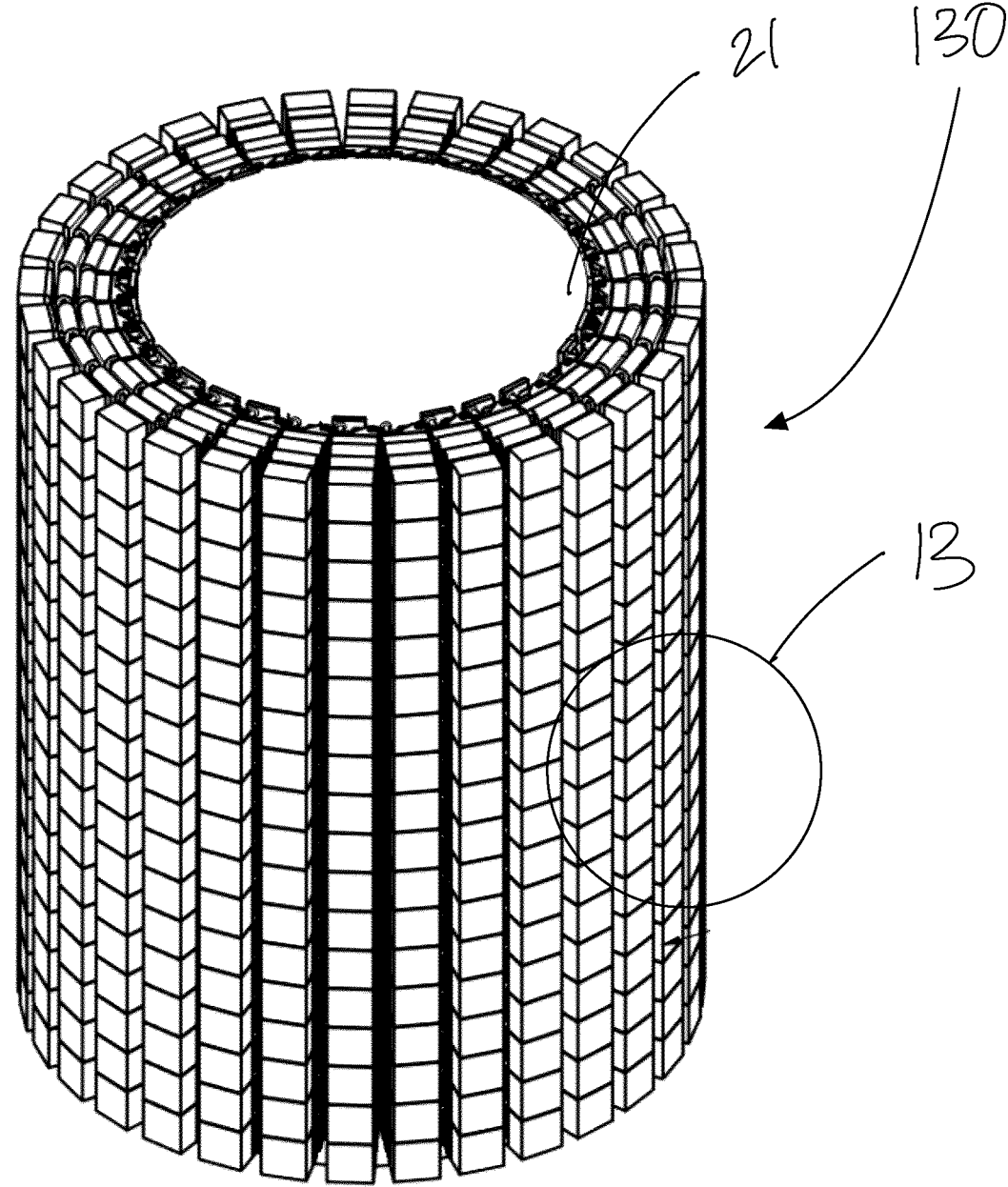
FIG. 13 is a perspective view of a cylindrical receiver in accordance with another aspect of the present disclosure.

FIG. 13 illustrates a cylindrical receiver 130 made of multiple micro-reactors (such as the micro-reactors 10). The micro-reactors can be assembled on any surface, flat or curved to form a 3D receiver of any shape and size. For any configuration or shape of the receiver, a gap may remain between the reactors, with the reactors connected via their cold sides in the manner described herein.

The receivers of FIGS. 10 to 13 may be described as being matrices of micro-reactors for a reforming process having a plurality of micro-reactors, the micro-reactors including a cold side and a hot side opposite the cold side, the micro-reactors configured to be supported by the cold side, the hot side configured to be exposed to a heat source, inlets defined in the cold side, the inlets configured for receiving reagents, an outlet defined in the cold side, the outlet configured for exiting reforming products, a reforming chamber in the hot side, one or more reforming chamber(s) having a catalyst, the reforming chamber configured for reforming the reagents into the reforming products, a reagent path from the inlets to the reforming chamber, the reagent path configured to feed the plurality of channels with reagents, and a reforming product path from the reforming chamber to the outlet, the reforming product path configured to receive products from the return plenum; and a common structure, the micro-reactors being connected by the cold side to the common structure, the common structure having conduit networks configured to feed the inlets of the micro-reactors with reagents and configured to receive products from the outlets of the micro-reactors. The hot sides of adjacent ones of the micro-reactors are separated by gaps.

Some of the technologies described herein may be economically viable solutions to use solar energy for hydrogen production. To allow accessible hydrogen costs, some of the technologies in question here circumvent the problem by reducing the size of the peripheral installations necessary for steam reforming (heat exchanger, evaporator, WGS reactor) and by increasing the density. power of the reactors, which allows them a low cost per watt.

The configuration of the micro-reactors 10 gives them the possibility of being positioned in the form of a quasi-2D matrix at the focus of concentrators, for example if the energy source is solar power. The network of collectors connecting the products from the micro-reactors 10 allows the flow of reagents to be controlled in zones, which makes it possible to reduce the number of controllers required to reach optimal operating temperatures, i.e., grouping multiple micro-reactors under a single controller. This control can also be improved by adding other heat, such as via electric heaters (e.g., FIG. 11). This approach, together with the sophisticated design of the catalyst bed, helps to maintain a uniform temperature in the catalyst bed under high incident heat flux.

Using a matrix of reactors rather than a single reactor allows receivers to have a variety of shapes, as shown in FIGS. 10-13 as examples. It is therefore possible to adapt to different kinds of hubs with the shown configuration. In addition, the use of a single reactor would imply high thermal stresses and strains, which is not the case for a die in which the height/length/width ratios are favorable.

Having a quasi-2D architecture allows a reduction in the power of the system proportional to the surface area of the reactor and not to the volume of the latter. The production cost may thus be reduced.

The behavior of the dual temperature controller of the reactor matrix may be adjusted according to instantaneous and/or forecast information on weather conditions and/or pricing and/or demand from the electrical network. For example, in the case of periods of low electricity pricing, the ratio of electrical energy flow to solar energy flow can be increased to slow the degradation of the absorptive solar surface of the reactor array, while maintaining a constant operating point in terms of temperature and reagent flow.

A thermal fuse may be integrated between the hot zone 10B of the reactors 10 and the cold zone 10A, the thermal fuse being activated when the maximum temperature reaches a critical value, in order to allow cooling by the cold part. This thermal fuse works by thermal contact with a structure that deforms by thermal expansion, until it forms a thermal bridge at the critical temperature. In the case of an electric auxiliary heater, an electric fuse may be installed to open the circuit and stop the electric heater when the critical temperature is reached. These protections may be integrated directly into the reactor.

The invention claimed is:

1. A micro-reactor for a reforming process comprising
a cold side and a hot side opposite the cold side, the reactor configured to be supported by the cold side, the hot side configured to be exposed to a heat source;
inlets defined in the cold side, the inlets configured for receiving reagents;
an outlet defined in the cold side, the outlet configured for exiting reforming products;
a reforming chamber in the hot side, the reforming chamber having a catalyst, the reforming chamber configured for reforming the reagents into the reforming products, the reforming chamber including channels extending toward an end surface on the hot side of the reforming chamber, and a return plenum;
a reagent path from the inlets to the reforming chamber, the reagent path configured to feed the plurality of channels with reagents; and
a reforming product path from the reforming chamber to the outlet, the reforming product path configured to receive products from the return plenum.

2. The micro-reactor according to claim 1, wherein the channels are defined in fins, the fins being hollow.

3. The micro-reactor according to claim 2, wherein ends of the fins contact a wall of the end surface of the chamber.

4. The micro-reactor according to claim 3, wherein the fins are normal to the end surface of the chamber.

5. The micro-reactor according to claim 2, including an inlet plenum, the fins being in fluid communication with the inlet plenum.

6. The micro-reactor according to claim 1, wherein the catalyst is in the return plenum.

7. The micro-reactor according to claim 6, wherein filters are provided at ends of the channels.

8. The micro-reactor according to claim 1, wherein the reagent path includes a plurality of parallel reagent passages extending from the inlet to the reforming chamber, the reforming product path includes a plurality of parallel product passages extending from the reforming chamber to the outlet.

9. The micro-reactor according to claim 8, wherein the reagent path and the reforming product path are arranged for in a side by side intertwined arrangement.

10. The micro-reactor according to claim 1, wherein the reagent path and the reforming product path are in a coil-shaped heat exchanger portion of the micro-reactor.

11. The micro-reactor according to claim 1, wherein the inlets include a liquid manifold and a gas manifold, and the outlet includes a products manifold, the manifolds being in the cold side of the micro-reactor.

12. The micro-reactor according to claim 11, wherein a vaporization portion is configured to receive liquid from the liquid manifold for producing steam.

13. The micro-reactor according to claim 11, further comprising a water-gas shift chamber downstream of the reforming chamber.

14. A system of a plurality of micro-reactors comprising:
a first set of the micro-reactors;
at least a second set of the micro-reactors;
a first reagent feed network in fluid communication with the first set of the micro-reactors;
a second reagent feed network in fluid communication with the second set of the micro-reactors;
at least one controller to control independently a feed of reagent to the first reagent feed network and to the second reagent feed network.

15. The system according to claim 14, wherein the micro-reactors are according to claim 1.

16. A matrix of micro-reactors for a reforming process comprising:
a plurality of micro-reactors, the micro-reactors including a cold side and a hot side opposite the cold side, the micro-reactors configured to be supported by the cold side, the hot side configured to be exposed to a heat source, inlets defined in the cold side, the inlets configured for receiving reagents,
an outlet defined in the cold side, the outlet configured for exiting reforming products,
a reforming chamber in the hot side, the at least one reforming chamber having a catalyst, the reforming chamber configured for reforming the reagents into the reforming products,
a reagent path from the inlets to the reforming chamber, the reagent path configured to feed a plurality of channels with reagents, and
a reforming product path from the reforming chamber to the outlet, the reforming product path configured to receive products from the return plenum; and
a common structure, the micro-reactors being connected by the cold side to the common structure, the common structure having conduit networks configured to feed the inlets of the micro-reactors with reagents and configured to receive products from the outlets of the micro-reactors;
wherein the hot sides of adjacent ones of the micro-reactors are separated by gaps.

17. The matrix according to claim 16, wherein the gaps between adjacent ones of the micro-reactors define overlap portions.

18. The matrix according to claim 16, including electric heaters having the hot sides of the micro-reactors.

19. The matrix according to claim 16, wherein the micro-reactors are according to claim 1.

20. The matrix according to claim 16, wherein the micro-reactors are arranged in at least a first set and a second set, wherein the conduit networks include at least a first reagent feed network in fluid communication with the first set of the micro-reactors and a second reagent feed network in fluid communication with the second set of the micro-reactors; and
at least one controller to control independently a feed of reagent to the first reagent feed network and to the second reagent feed network.

* * * * *